United States Patent [19]

Kenyon

[11] 4,196,024

[45] Apr. 1, 1980

[54] ALKYL PHOSPHATE SOLDERING FLUXES

[75] Inventor: William G. Kenyon, Wilmington, Del.

[73] Assignee: E. I. Du Pont de Nemours and Company, Wilmington, Del.

[21] Appl. No.: 957,232

[22] Filed: Nov. 2, 1978

[51] Int. Cl.$^2$ .............................................. B23K 35/34
[52] U.S. Cl. ........................................ 148/23; 228/223
[58] Field of Search ................................... 148/22–26; 228/223, 224

[56] References Cited

U.S. PATENT DOCUMENTS

| | | | |
|---|---|---|---|
| 2,658,846 | 11/1953 | DeRosa | 148/25 |
| 3,412,113 | 11/1968 | Fitch | 148/23 |
| 3,944,123 | 3/1976 | Jacobs | 148/23 |
| 3,970,238 | 7/1976 | Aronberg | 228/223 |
| 4,059,218 | 11/1977 | Choby | 148/23 |
| 4,113,526 | 9/1978 | Stayner | 148/23 |

*Primary Examiner*—P. D. Rosenberg
*Attorney, Agent, or Firm*—F. J. Crowley

[57] ABSTRACT

Soldering with solder fluxes consisting essentially of mono- and/or di-alkyl phosphates and alkyl amine salts of these phosphates wherein the alkyl groups of said phosphates and their salts contain 4–20 carbon atoms.

10 Claims, No Drawings

ALKYL PHOSPHATE SOLDERING FLUXES

BACKGROUND OF THE INVENTION

1. Field of the Invention

The invention is in the field of soldering, and soldering fluxes, particularly the soldering of electronic circuit boards.

2. Description of the Prior Art

The soldering or joining of metal objects by applying and solidifying a molten lead-tin alloy on the surface of the metal is a very well known and widely used technique. In such an operation, it is generally the practice to apply a flux to the soldering area so that the solder will properly bond. The flux reduces the surface tension at the interface between the molten solder and the metal surface to which it is applied, thus permitting the solder to wet and spread over the metal surface to produce level soldering. In addition to reducing surface tension, the flux protects the soldering surface from oxidation by air, and at soldering temperatures it acts to remove tarnish that might otherwise affect the soldered bond.

In the electronics industry, where this invention has particular application, fluxes based on rosin are now generally used. However, rosin fluxes and their degradation produces can be difficult to remove from the solder site with mild solvents after soldering. This is disadvantageous since a high degree of post-soldering cleanliness is needed for electronic components to avoid electrical malfunction.

Particular application of this invention is in the soldering of circuit boards associated with wiring assemblies in the radio, television, and telecommunication industries. A circuit board consists of an electrically non-conductive plastic plate normally reinforced by glass fibers and typically about 1.5 mm thick, having electrical connectors installed on one side. The connectors are thin flat strips, usually of copper, adhered to the plate. The connectors may be pretinned. Holes passing through the plate and the appropriate connector provide access for the leads of electronic components mounted on the side opposite the connectors. The leads from the electronic components, which may comprise resistors, condensers, transformers, integrated circuits, etc., may be crimped or riveted to the connectors. Electrical integrity of the connections is assured by soldering.

Modern industrial practice in the soldering of circuit boards is continuous and comprises coating the connector side of the board with flux, e.g., by brushing or spraying on the molten flux neat or in mixture with, for example, isopropanol, or by passing the connector side of the board through foam formed from the flux mixture. After preheating by passing the board over a heat source, the connector side is passed through a wave of fused solder which is being pumped out of a slot. In some wave soldering machines, the solder is pumped together with oil which serves as a barrier to help prevent oxidation of the fused solder. Manko, in Solders and Soldering, McGraw-Hill Book Co., New York, NY (1964), describes the solder wave technique.

After a short period of cooling, the soldered board is passed through a vapor defluxer, also known as a vapor degreaser, which contains a solvent to remove the flux and its degradation products. Various solvents are currently employed. Mild solvents such as azeotropic mixtures of 1,1,2-trichloro-1,2,2-trifluoroethane with small amounts of a more active solvent, such as an alcohol, are usually preferred. Active solvents of the art which are combined with 1,1,2-trichloro-1,2,2-trifluoroethane for this purpose are: ethanol; acetone; trans-1,2-dichloroethylene (U.S. Pat. No. 3,455,835); acetone/ethanol (U.S. Pat. No. 3,728,268); ethanol/nitromethane (U.S. Pat. No. 3,903,009); and methanol/nitromethane (U.S. Pat. No. 3,960,746).

Modern electronic design has placed new and more severe requirements on the fluxing and postsoldering cleaning steps. For example, miniaturization, and consequent placement of connectors very close together, requires that the flux provide a high degree of solder leveling to avoid so-called bridging between connectors, and the board must be left especially clean by the cleaning solvent.

The art teaches flux combinations of mono- and di-alkyl phosphates and various high molecular weight carboxylic acids and esters. For example, U.S. Pat. No. 3,944,123 teaches as additives to such alkyl phosphates various long-chain carboxylic acids and rosin, which consists of natural high molecular weight carboxylic acids. U.S. Pat. No. 2,658,846, teaches the use of lanolin in combination with alkyl phosphates. Lanolin consists of natural esters of high molecular weight carboxylic acids. However, Barber, in "Solder, Its Fundamentals and Usage", Kester Solder Co., Division of Litton Industries, Chicago, IL (1965) p. 19, teaches that the long-chain carboxylic acids produce sticky greasy residues and present a problem in flux residue removal. The contemplated procedures of the instant invention makes unnecessary the use of high molecular weight carboxylic acids and esters and provides soldered circuit boards readily cleaned with mild solvents.

SUMMARY OF THE INVENTION

The present invention provides an improvement in the conventional soldering of metal by fusing solder to the surface of the metal to form a bond. The improvement is achieved through the use of a new flux composition which results in level soldering and is readily removed after soldering by cleaning the soldering surface with an organic solvent containing 1,1,2-trichloro-1,2,2-trifluoroethane. The flux consists essentially of mono- and/or di-alkyl phosphates in which the alkyl groups contain four to twenty carbon atoms. It is also within the scope of this invention to use the salts of these phosphates which are obtained by neutralizing the phosphate with a mono-, di-, or tertiary alkyl amine containing 4 to 20 carbon atoms. Such salts include monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof. These phosphate fluxes can be applied to the work piece without the incorporation of additional ingredients or they may be used in a liquid carrier, such as isopropanol or 2-butoxy-1-ethanol. The concentration of the phosphate in the carrier can vary over a wide range, the chief consideration being the use of an amount which is effective to promote level soldering. In general, 5-60 wt. % of the phosphate in the carrier will produce a satisfactory flux composition. It is also within the scope of this invention to apply fluxes in the form of a foam as is common in the electronic industry. Commercially available foaming agents can be used with the phosphate and carrier in amounts which are effective to create the type of foam which is conventional for preparing circuit boards for soldering. As little as 0.2 wt. % of certain foaming agents have produced suitable foams, but larger amounts, e.g., as high as 15 wt. %, can also be used.

The alkyl phosphates of this invention, sometimes called phosphoric acid esters of alcohols, are well known commercial products usually prepared by reacting phosphorous pentoxide with the corresponding alcohol. The reaction usually produces a random mixture containing both mono- and di-alkyl phosphates, and it is for this reason that many of the phosphate products described herein are mixtures rather than a single compound. Methods for preparing these phosphates are discussed by Kosolapoff in "Organophosphorous Compounds", John Wiley & Sons, Inc., New York, NY (1950) pp 220–223.

The alkyl ammonium alkyl phosphates of this invention are also well known compounds which are prepared by the addition of a primary, secondary or tertiary $C_4$–$C_{20}$ straight chain or branched alkyl amine to the mono- and di-alkyl phosphates heretofore described. These amines will form salts with the phosphates. The amount of amine added can vary over a relatively wide range. It is recommended that the amount of amine added be no greater than the amount needed to neutralize the alkyl phosphate since amounts in excess of this limit do not enter into reaction with the alkyl phosphate and thus the excess amount introduces extraneous material into the composition flux. One method that has been used to insure that excess amine is not used is to shake a flux sample with an equal volume of water and measure the pH of the liquid with pH indicator paper. A reading in the range of 5–7 is considered to indicate that the mixture is either at or very near neutralization. In the Tables which appear later in this specification, the data given in the column headed "Apparent pH" was obtained by this procedure. One skilled in the art will recognize that the values given are not true pH readings since the fluxes are not true aqueous solutions. Nevertheless, for purposes of this invention, this pH test as described is sufficient to prepare the amine salts that are useful. As will be apparent from a reading of this specification, the use of less than a neutralizing amount of amine is completely acceptable since such a flux would be composed of the alkyl phosphate and a portion of neutralized compound; i.e., the alkyl ammonium alkyl phosphate, and both of these compounds are useful in the present invention.

In general, the alkyl phosphates, in the absence of alkyl amine, provide fair to good leveling, but their residues are often less readily cleaned with mild solvents than are the amine-containing mixtures, as demonstrated hereinafter. Both the alkyl phosphate and the optional alkyl amine may contain four to twenty carbon atoms.

Selection of the carrier is best done following experimental trial. In some cases better levelness and post-soldering cleanliness are obtained with isopropanol carrier; sometimes a higher boiling liquid such as 2-butoxy-1-ethanol gives better results. Other liquids can be used. Frequently use of a more concentrated mixture will give good results whereas the same ingredients may not be entirely satisfactory in a less concentrated mixture. The creation of suitable formulations for combinations within the invention but not specifically set forth herein can be achieved by routine testing. Most of the alkyl phosphates useful in this invention alone or in combination with alkyl amines, are semisolid at room temperature and can be applied as is or they can be melted and applied in the melted state. Mixtures of amines and mixtures of phosphates within the scope of this invention may be employed and alkyl groups within a single compound need not be identical.

The selection of a foaming agent for use in carrier/flux combinations is best undertaken following preliminary trial as described in Example 32. In general, the nonionic polyoxy lower alkylene oxide glycols of molecular weight at least about 600 are adequate in about 5 wt. % concentration. Some fluxes, in high concentration, foam satisfactorily without foaming agent.

The invention is further described in examples following.

EXAMPLES 1–30

These examples demonstrate soldering of commercial circuit boards in a commercial wave soldering machine.

The following equipment, solvent and circuit board test pieces were employed.

Soldering Machine:

Ultra Pack, Model No. SF SJ 15-UPK wave solder machine manufactured by Electrovert Ltd., Toronto, Ontario, providing a 38 cm wide eutectic soft solder (63% Sn, 37% Pb (wt.)) wave at 260° C., a radiant preheater plate at 400° C. and a belt moving a holder having "fingers" to support the circuit board, moving at 0.020 meter per second.

Defluxer:

Model PSD 1012-W, two-sump, 3.9 kw electrically heated vapor degreaser comprising a condensate reservoir and spray, manufactured by Branson Cleaning Equipment Co., Shelton, CN, and having 25×30.5×25 cm deep sumps.

Defluxing Solvent:

Azeotropic mixture of 94.05% 1,1,2-trichloro-1,2,2-trifluoroethane, 5.70% methanol, and 0.25% by wt. nitromethane (inhibitor) as described in U.S. Pat. No. 3,960,746.

Circuit Board Test Pieces:

8.9×10.2 cm×1.6 mm thick glass fiber-reinforced epoxy boards as are used in the trade, having on one side 156 pretinned connectors, each having 3 lead holes.

Procedure

Candidate fluxes, neat or in a carrier, were applied by brush to the connector side of the boards. They were then placed connector side down between the "fingers" of the soldering machine holder. After passing over the radiant plate preheater, the connector sides of the boards were passed through the solder wave.

Thereafter the boards were removed from the soldering machine and transferred to the defluxer with forceps where they were held two minutes in the boiling sump and one minute in the rinse sump, then sprayed 30 seconds on each side and held 30 seconds in the vapor space.

The boards were removed and examined. In connection with the quality of soldering, i.e., levelness, the presence of large "icicles" or bridging between circuits gave the boards on which they appeared an unsatisfactory rating, i.e., 1 in Table I. If examination under 20 fold magnification showed unlevelness, e.g., as caused by less than complete wetting, but good electrical connection was evident, the board was rated "fair", i.e., 2. Better levelness brought a "good" rating, and a high degree of levelness, evident good wetting and smooth solder surface brought a rating of "excellent" or 4 in Table I.

Similarly, ratings for cleanliness were made ranging from a value of 1 for unsatisfactory flux bridging and flux degradation products observed between circuits to a value of 4 for complete absence of these materials on examination under 20 fold magnification. The results of these examinations are shown in Table I in the double columns headed "Soldering Evaluation". Compositions falling within the invention are numbered; comparison compositions falling outside the invention are lettered. The columns headed by "Phosphate" and "Amine" set out the flux ingredients applied in the carriers shown in the column headed "Carrier". The entries in the column headed "Apparent pH" give a measure of the degree of neutralization of the phosphate by the amine, as determined with pH indicator paper in the test described earlier in this specification.

TABLE I

| Example No. (within invention) or Comparison Letter (outside invention) | Phosphate | Amine | Apparent pH | Carrier (wt. % of active ingredients A = Isopropanol B = 2-butoxy-1-ethanol (a) | Soldering Evaluation 1 = Unsatisfactory 2 = Fair 3 = Good 4 = Excellent | |
|---|---|---|---|---|---|---|
| | | | | | Levelness | Cleanliness |
| A | Orthophosphoric Acid | None | 1 | A (1) | 1 | 1 |
| B | Dimethyl | " | 1 | None | 3 | 1 |
| 1 | Mono-n-butyl | " | — | " | 2 | 2 |
| 2 | Mono-n-butyl | Mono $C_{12-14}$ [b] | 7 | A (15) | 2 | 2 |
| 3 | Mono-n-butyl | Mono $C_{12-14}$ [b] | | B (15) | 3 | 2 |
| 4 | Di-n-butyl | None | — | A (50) | 2 | 2 |
| 5 | Mixed mono- & di-n-butyl | " | 1 | None | 2 | 2 |
| C | Mixed mono- & di-n-butyl | " | | A (15) | 3 | 1 |
| D | Mixed mono- & di-n-butyl | " | | B (15) | 1 | 1 |
| E | Mixed mono- & di-n-butyl | " | | A (50) | 3 | 1 |
| F | Mixed mono- & di-n-butyl | " | | B (50) | 2 | 1 |
| 6 | Mixed mono- & di-n-butyl | Monoisopropyl | 2-3 | A (15) | 2 | 2 |
| G | Mixed mono- & di-n-butyl | " | | B (15) | 1 | 3 |
| 7 | Mixed mono- & di-n-butyl | " | | A (50) | 2 | 3 |
| 8 | Mixed mono- & di-n-butyl | " | | B (50) | 2 | 2 |
| H | Mixed mono- & di-n-butyl | Mono-n-octadecyl | — | A (15) | 1 | 2 |
| I | Mixed mono- & di-n-butyl | Mono-n-octadecyl | | B (15) | 1 | 1 |
| 9 | Mixed mono- & di-n-butyl | Mono-n-octadecyl | | A (50) | 2 | 3 |
| 10 | Mixed mono- & di-n-butyl | Mono-n-octadecyl | | B (50) | 2 | 3 |
| J | Tri-n-butyl | None | — | None | 1 | 1 |
| 11 | Mixed mono- & di-iso-octyl (g) | " | — | A (50) | 3 | 3 |
| 12 | Mixed mono- & di-iso-octyl (g) | Mono-n-butyl | 5 | A (15) | 3 | 2 |
| 13 | Mixed mono- & di-iso-octyl (g) | Mono-n-butyl | | B (15) | 3 | 3 |
| 14 | Mixed mono- & di-iso-octyl (g) | Tri-n-hexyl | — | A (15) | 2 | 2 |
| 15 | Mixed mono- & di-iso-octyl (g) | Tri-n-hexyl | | B (15) | 3 | 3 |
| 16 | Mixed mono- & di-iso-octyl (g) | Tri-n-hexyl | | A (50) | 4 | 2 |
| 17 | Mixed mono- & di-iso-octyl (g) | Tri-n-hexyl | | B (50) | 4 | 2 |
| K | Mixed mono- & di-iso-octyl (g) | Mono-2-ethylhexyl | 6 | A (15) | 3 | 1 |
| 18 | Mixed mono- & di-iso-octyl (g) | Mono-2-ethylhexyl | | B (15) | 3 | 2 |
| 19 | Mixed mono- & di-iso-octyl (g) | Mono-2-ethylhexyl | | A (50) | 3 | 2 |
| 20 | Mixed mono- & di-iso-octyl (g) | Mono-2-ethylhexyl | | B (50) | 3 | 3 |
| L | Mixed mono- & di-iso-octyl (g) | Tri-n-dodecyl [c] | 5 | A (15) | 1 | 3 |
| M | Mixed mono- & di-iso-octyl (g) | Tri-n-dodecyl [c] | | B (15) | 1 | 3 |
| N | Mixed mono- & di-iso-octyl (g) | Mono coco [d] | — | A (15) | 1 | 2 |
| O | Mixed mono- & di-iso-octyl (g) | Mono coco [d] | | B (15) | 1 | 3 |
| 21 | Mixed mono- & di-iso-octyl (g) | Mono coco [d] | | A (50) | 3 | 3 |
| 22 | Mixed mono- & di-iso-octyl (g) | Mono coco [d] | | B (50) | 3 | 3 |
| 23 | Mixed mono- & di-iso-octyl (g) | Mono $C_{12-14}$ [b] | — | None | 3 | 3 |
| 24 | Mixed mono- & di-iso-octyl (g) | Mono $C_{12-14}$ [b] | | A (50) | 3 | 3 |
| P | Mixed mono- & di-iso-octyl (g) | Di-n-dodecyldimethyl | — | Toluene (60) | 1 | 3 |
| Q | Mixed mono- & di-iso-octyl (g) | Mono-n-octadecyl [e] | — | A (15) | 1 | 3 |
| R | Mixed mono- & di-iso-octyl (g) | Mono-n-octadecyl [e] | | B (15) | 1 | 3 |

TABLE I-continued

| Example No. (within invention) or Comparison Letter (outside invention) | Phosphate | Amine | Apparent pH | Carrier (wt. % of active ingredients A = Isopropanol B = 2-butoxy-1-ethanol (a) | Soldering Evaluation 1 = Unsatisfactory 2 = Fair 3 = Good 4 = Excellent | |
|---|---|---|---|---|---|---|
| | | | | | Levelness | Cleanliness |
| 25 | Mixed mono- & di-iso-octyl (g) | Di-n-octadecyl(f) | 3 | A (15) | 3 | 3 |
| 26 | Mixed mono- & di-iso-octyl (g) | Di-n-octadecyl(f) | | B (15) | 2 | 3 |
| 27 | Di-2-ethylhexyl | None | — | A (50) | 2 | 3 |
| S | Tri-2-ethylhexyl | " | 2 | None | 1 | 1 |
| 28 | Di-n-octadecyl | " | — | A (50) | 3 | 3 |
| 29 | Di-n-octadecyl | Mono $C_{12-14}$(b) | 5 | A (15) | 3 | 2 |
| 30 | Di-n-octadecyl | Mono $C_{12-14}$(b) | | B (15) | 4 | 2 |

Footnotes
(a)Sold by Union Carbide Corp., New York, NY, under the tradename "butyl cellosolve".
(b)Tertiary alkyl primary amine with highly branched alkyl chain in which the primary amine nitrogen is attached to a tertiary carbon atom sold by Rohm & Haas Co., Philadelphia, PA, under the tradename "Primene 81R".
(c)Trilauryl amine sold by General Mills Chemicals, Inc., Minneapolis, MN, under the tradename "Alamine 304".
(d)The amine is derived from the fatty acids of coconut oil via the nitrile and comprises species ranging from $C_8$ to $C_{18}$ peaking at $C_{12}$ (47%). Product is sold by Armak Chemicals Division of Akzona, Inc., Chicago, IL, under the tradename "Armeen C".
(e)The results of Comparisons Q and R were not satisfactory. It is believed that the failure was due totar in the amine since a black residue was observedwhen it was mixed with the phosphate.
(f)"Armeen" 2S, a product of Armak Chemicals Division of Akzona, Inc., Chicago, IL.
(g)Alkyl group derived by oxo process.

Examination of Table I permits a number of conclusions as to satisfactory and unsatisfactory combinations.

In Comparison A, one sees that orthophosphoric acid, a component of a number of solder fluxes of the prior art is unsatisfactory.

Dimethyl phosphate, of Comparison B, although providing good levelness, is not satisfactorily removed by the defluxing solvent.

Comparisons J, L and S, directed to trialkyl phosphates, demonstrate that compounds of this class are also not useful in the instant invention process.

Comparison P employs mono-, di-isooctyl phosphate in combination with di-n-dodecyldimethyl amine. The latter is outside the scope of this invention since it is a quaternary amine. It will be seen that this type of amine did not produce satisfactory results.

It can be seen from the examples in Table I that the specific compounds of this invention and formulations containing them may require preliminary testing by trial and error soldering tests to obtain a satisfactory product. This fact is demonstrated by the results reported in Table I for mixed mono- and di-n-butyl phosphate. For example, this phosphate is operable when applied neat as in Example 5, but is inoperable when applied at 15% and 50% concentration in isopropanol and in 2-butoxy-1-ethanol as in Comparisons C, D, E and F. On addition of monoisopropyl amine, the resulting combination is operable in 15 and 50% concentration in both isopropanol and 2-butoxy-1-ethanol as shown in Examples 6, 7 and 8. The combinations of Comparisons H and I are inoperable at 15% but are operable in the same carriers at 50% concentration as demonstrated by Examples 9 and 10.

EXAMPLE 31

This example presents two experiments involving the use of foams in soldering of a wiring assembly on a circuit board. In both experiments flux solutions were applied as foam to the connector side of the board. In the first experiment no foaming agent was needed. The flux active ingredient, employed in high concentration in isopropanol, foamed without special foaming agent. In the second experiment a foaming agent was added to a less concentrated flux mixture. The same machinery, defluxing solvent and test pieces were used in the two experiments.

Soldering Machine:
Wave soldering machine manufactured by Hollis Engineering, Inc., Nashua, NH. The machine employed an inclined conveyor, "Cal-Rod" preheaters and oil.

Defluxer:
Model MLR 420 refrigeration-cooled 6 kw 2-sump immersion/spray degreaser having sumps 51 cm×61 cm×46 cm deep, manufactured by Baron-Blakeslee Inc., Chicago, IL.

Defluxing Solvent:
Azeotropic mixture of 94.05% 1,1,2-trichloro-1,2,2-trifluoroethane, 5.70% methanol and 0.25% by wt. nitromethane as described in U.S. Pat. No. 3,960,746.

Wiring Assembly:
14×14 cm×1.6 mm thick glass fiber reinforced epoxy circuit boards having pretinned connectors on one side were employed. On the other side were mounted a circuit and about 75 components forming a commercial telecommunications module comprising disc and electrolytic capacitors, resistors, switches, transistors, integrated circuits, relays, transformers and the like.

EXPERIMENT (a)

In the first experiment a flux mixture consisting of 2-ethylhexylammonium mixed mono- and di-isooctyl phosphate and an equal weight of isopropanol was placed in the foam applicator so arranged as to permit the circuit to "kiss" the foam as it passed over the applicator. The fluxed assemblies were passed over the preheater and through the inclined solder wave at speeds of 0.030, 0.038, 0.051 and 0.076 m/s. Soldering was satisfactory in all cases except that, at the highest speed, solder tended to spill over the leading edge.

The soldered assemblies were transferred to the defluxer in a wire basket, and there defluxed by two-minute immersion, first in the boil sump and then in the rinse sump.

Both levelness and cleanliness at all speeds were good, corresponding to ratings of 3 in both categories, as defined above.

EXPERIMENT (b)

A second experiment was carried out in the same way except that a different flux was employed and the conveyor speed was 0.030 and 0.061 m/s. The flux mixture employed contained:

| | |
|---|---|
| Mono $C_{12-14}$ alkyl ammonium mono- and di-isooctyl phosphate[1] | 15 wt. % |
| $F(CF_3CFCF_2O)_4C(CF_3)FH$[2] | 0.25 wt. % |
| Isopropanol | Remainder |

[1] Active ingredient of Examples 23, 24, Table I.
[2] Foaming agent. See Selman et al, U.S. Patent 3,342,875 for preparation of this compound.

Levelness and cleanliness were in all cases good, corresponding to ratings of 3 as defined above.

EXAMPLE 32

A number of foaming agents were tested for foaming efficacy in isopropanol in the presence of 10 wt. % mono $C_{12-14}$ alkyl ammonium mono- and di-isooctyl phosphate (active ingredient of Examples 23, 24, Table I). The test consisted in placing 125 ml of test mixture in a 400 ml calibrated beaker and passing a stream of air through the mixture by means of a sintered glass filter stick. The flow of air was constant thus to make results comparable within a series. In some cases 6 drops of perfume was added to mask the odor of some of the components of the mixture. The volume of the liquid and the foam was noted as a measure of efficacy. A volume increase to about 250 ml was considered acceptable for operability in the usual commercial foam applicator.

The results are shown in Table II.

TABLE II

| No. | Agent Conc. (% by wt.) | Foaming Agent | Liquid and Foam Volume |
|---|---|---|---|
| 1 | 0 | None (perfume) | 150 |
| 2 | 5 | 2-methyl-2,4-pentanediol[1] (perfume) | 175 |
| 3 | 5 | Emulsifying wax[2] (perfume) | 200 |
| 4 | 5 | 2-methyl-2,4-pentanediol[1] | 225 |
|   | 5 | Emulsifying wax[2] (perfume) |  |
| 5 | 5 | Octyl phenoxy polyethoxy-ethanol[3] (perfume) | 250 |
| 6 | 5 | 2-methyl-2,4-pentanediol[1] | >400 |
|   | 5 | Emulsifying wax[2] |  |
|   | 5 | Octyl phenoxy polyethoxy-ethanol[3] (perfume) |  |
| 7 | 1 | Stearyl alcohol | 225 |
|   | 1 | Cetyl alcohol |  |
|   | 1 | Polyoxyethylene (2 mol) cetyl ether[4] |  |
| 8 | 2.5 | 2-methyl-2,4-pentanediol[1] | 300 |
|   | 2.5 | Emulsifying wax[2] |  |
|   | 2.5 | Octyl phenoxy polyethoxy-ethanol[3] |  |
| 9 | 10 | Octyl phenoxy polyethoxy-ethanol[3] | 350 |
| 10 | 2 | Fatty acid alkanol amide[5] | 200 |
|   | 3 | Sodium lauryl sulfate[6] |  |

[1] Sold by Union Carbide Corp., New York, NY, under the tradename "Hexylene glycol".
[2] Sold by Croda, Inc., New York, NY, under the tradename "Polawax".
[3] Sold by Rohm & Haas Co., Philadephia, PA, under the trade name "Triton X-100".
[4] Sold by ICI America, Wilmington, DE, under the trade name "Brij 52".
[5] Sold by Stepan Chemical Co., Northfield, IL, under the trade name "Ninol".
[6] Sold by E. I. du Pont de Nemours & Co., Inc., Wilmington, DE, under the trade name "Dupanol XL".

In a second series similar foaming tests were carried out on foaming agents in isopropanol in the presence of 15 wt. % mono $C_{12-14}$ alkyl ammonium mono- and di-isooctyl phosphate [1]. The results are shown in Table III.

TABLE III

| No. | Conc. (% by wt.) | Foaming Agent | Liquid And Foam Volume |
|---|---|---|---|
| 1 | 1 | Polyoxyethylene glycol[2] mol wt 600 | 200 |
| 2 | 1 | Polyoxyethylene/Polyoxypropylene (1:1 mol) glycol mol wt 4500[3] | 225 |
| 3 | 1 | Polyoxypropylene glycol mol wt 2025 | 200 |
| 4 | 5 | Polyoxyethylene glycol[2] mol wt 600 | 250-275 |
| 5 | 5 | Polyoxyethylene/Polyoxypropylene (1:1 mol) glycol mol wt 4500[3] | >400 |
| 6 | 5 | Polyoxypropylene glycol mol wt 2025 | 400 |

[1] Active ingredient of Examples 23, 24, Table I.
[2] Sold by Union Carbide Corp., New York, NY, under the trade name "Carbowax 600".
[3] Sold by BASF Wyandotte Corp., Wyandotte, MI, under the trade name "Pluronic P-85 Surfactant".

That the foaming agents do not adversely affect the fluxing properties of the mixtures in which they are applied was demonstrated by soldering trials under the conditions of Examples 1–31 employing flux mixtures 4, 5 and 6 above applied as foams. Although there were a few small solder "icicles" of less than 1 mm length (which might have been eliminated by change in machine conditions), the boards were considered satisfactory. The solder was particularly bright, levelness was good and there were no bare connectors.

Preferred fluxes are those falling within the definition of the invention which are essentially completely neutralized with an amine as defined. More preferred are those alkyl phosphates as defined containing one and two alkyl groups each containing about eight carbon atoms in combination with approximately one molar amount of a mono alkyl amine containing about twelve carbon atoms. Most preferred is mono-, di-isooctyl phosphate neutralized with a mono $C_{12-14}$ alkyl amine as shown in Examples 23 and 24.

Flux/carrier mixtures are preferred over neat fluxes; most preferred are the flux/isopropanol mixtures. In the foam application embodiment it is preferred to employ foaming agents. Preferred foaming agents are polyoxyethylene or propylene glycols of molecular weight at least about 600; most preferred is polyoxyethylene/polypropylene (1:1 mole) glycol of molecular weight about 4500.

The embodiments of the invention in which an exclusive property or privilege is claimed are defined as follows:

1. In a process of soldering wherein solder is fused to a metal surface, the improvement comprising fusing the solder to the metal surface in the presence of a flux consisting of phosphate compounds selected from the group consisting of monoalkyl phosphates, dialkyl phosphates, monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof, and wherein the alkyl groups of said phosphates contain 4–20 carbon atoms.

2. The process of claim 1 wherein the flux is mono $C_{12}$–$C_{14}$ alkyl ammonium mono- and di-isooctyl phosphate.

3. In a process of soldering wherein solder is fused to a metal surface, the improvement comprising applying the solder to the metal surface in the presence of a flux consisting of
  (1) phosphate compounds selected from the group consisting of monoalkyl phosphates, dialkyl phosphates, monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof, and wherein the alkyl groups of said phosphates contain 4–20 carbon atoms, and
  (2) a carrier for said flux selected from the group consisting of isopropanol and 2-butoxy-1-ethanol.

4. The process of claim 3 wherein the flux is mono $C_{12}$–$C_{14}$ alkyl ammonium mono- and di-isooctyl phosphate.

5. In a process of soldering wherein solder is fused to a metal surface, the improvement comprising applying the solder to the metal surface in the presence of a flux consisting of
  (1) phosphate compounds selected from the group consisting of monoalkyl phosphates, dialkyl phosphates, monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof, and wherein the alkyl groups of said phosphates contain 4–20 carbon atoms.
  (2) a carrier for said flux selected from the group consisting of isopropanol and 2-butoxy-1-ethanol, and
  (3) a foaming agent in an amount effective to produce a foam.

6. The process of claim 5 wherein the flux is mono $C_{12}$–$C_{14}$ alkyl ammonium mono- and di-isooctyl phosphate.

7. A soldering flux consisting of
  (1) phosphate compounds selected from the group consisting of monoalkyl phosphates, dialkyl phosphates, monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof, and wherein the alkyl groups of said phosphates contain 4–20 carbon atoms, and
  (2) a carrier for said flux selected from the group consisting of isopropanol and 2-butoxy-1-ethanol.

8. The soldering flux of claim 7 wherein the phosphate is mono $C_{12}$–$C_{14}$ alkyl ammonium mono- and di-isooctyl phosphate.

9. A soldering flux consisting of
  (1) phosphate compounds selected from the group consisting of monoalkyl phosphates, dialkyl phosphates, monoalkyl ammonium monoalkyl phosphates, dialkyl ammonium monoalkyl phosphates, trialkyl ammonium monoalkyl phosphates, monoalkyl ammonium dialkyl phosphates, dialkyl ammonium dialkyl phosphates, trialkyl ammonium dialkyl phosphates, and mixtures thereof, and wherein the alkyl groups of said phosphates contain 4–20 carbon atoms,
  (2) a carrier for said flux selected from the group consisting of isopropanol and 2-butoxy-1-ethanol, and
  (3) a foaming agent in an amount effective to produce a foam.

10. The soldering flux of claim 9 wherein the phosphate is mono $C_{12}$–$C_{14}$ alkyl ammonium mono- and di-isooctyl phosphate and the carrier is isopropanol.

* * * * *